United States Patent [19]
Todd

[11] Patent Number: 5,985,352
[45] Date of Patent: Nov. 16, 1999

[54] HIGH TEMPERATURE EXTRACTION OF SPICES AND HERBS

[75] Inventor: George N. Todd, Kalamazoo, Mich.

[73] Assignee: Kalamazoo Holdings, Inc., Kalamazoo, Mich.

[21] Appl. No.: 09/185,397

[22] Filed: Nov. 3, 1998

Related U.S. Application Data

[62] Division of application No. 08/989,356, Dec. 12, 1997.

[51] Int. Cl.$^6$ .......................... A23L 1/222; A23L 1/221; A23L 1/10; A23L 1/28
[52] U.S. Cl. ...................... 426/651; 426/650; 426/481; 426/489; 426/638; 426/521
[58] Field of Search .................... 426/478, 489, 426/481, 487, 651, 638, 634, 650, 655

[56] References Cited

U.S. PATENT DOCUMENTS

| | | | |
|---|---|---|---|
| 606,624 | 6/1898 | Gebhardt | 426/638 |
| 2,507,084 | 5/1950 | Ansel | 426/424 |
| 3,908,031 | 9/1975 | Wistreich et al. | 426/335 |
| 4,123,559 | 10/1978 | Vitzthum | 426/312 |
| 4,158,708 | 6/1979 | Chiovini et al. | 426/650 |
| 4,198,432 | 4/1980 | Vitzthum | 426/650 |
| 4,847,106 | 7/1989 | Pike et al. | 426/629 |
| 4,985,265 | 1/1991 | Duboc | 426/425 |
| 5,026,550 | 6/1991 | Aeschbach et al. | 426/542 |
| 5,120,558 | 6/1992 | Nguyen et al. | 426/425 |
| 5,466,459 | 11/1995 | Wilson | 426/407 |
| 5,525,260 | 6/1996 | Aeschbach et al. | 426/253 |

FOREIGN PATENT DOCUMENTS

0477825A2  4/1992  European Pat. Off. .

OTHER PUBLICATIONS

Database Abstract. FSTA. AN 87(10):T0037. Journal of Food Hygienic Society of Japan. 27(6) pp. 615–618. Authors: Hirayama et al., 1986.

*Primary Examiner*—Anthony J. Weier
*Attorney, Agent, or Firm*—The Firm of Gordon W. Hueschen

[57] ABSTRACT

Principal components of herb or spice plant materials are simultaneously extracted and concentrated in at least one high temperature and pressure mechanical pressing step. The extract may be hydrated and then centrifuged to remove fine particulate solids and gums. A solution having several times the concentration of the pigments and flavor and aroma components of the starting raw material is obtained. The residual press solids and extract have significantly reduced bacterial counts as a result of the temperatures, high pressure, and high shear utilized, as well as the low moisture levels employed, thus producing not only a food grade extract but also a food grade residual solid having low bacterial counts and predictable, standardized levels of the principal components of interest. Additionally, edible antioxidants can be included in the process to enhance the stability of both the extract and the residual solids. The residual solids are ruptured in the process, giving rise to a quick-release and enhanced effect, and thus greater use effectiveness, when the herb or spice solids are used in foods or beverages.

8 Claims, 1 Drawing Sheet

HIGH TEMPERATURE EXTRACTION OF SPICES AND HERBS

The present application is a divisional of my prior-filed copending application Ser. No. 08/989,356, filed Dec. 12, 1997.

FIELD OF THE INVENTION

The extraction of the principal significant components of herb and spice plants containing pigment, flavor, and aroma and, when present in the starting plant material, antioxidant.

Of especial interest is the extraction of the principal significant components of spices and herbs represented by plants of the family Umbelliferae, representatively celery, lovage, dill, carrot, fennel, cumin, caraway, parsley, coriander, angelica, and anise; Myrtaceae, representatively allspice and clove; of the genus Myristica, representatively mace and nutmeg; of the genus Piper, representatively black and white pepper; of the genus Sesamum, representatively sesame seed; the defining characteristic being that it is of such a spice or herb plant material from which flavor, aroma, color, and/or antioxidant can be extracted and used to flavor and/or color foods and beverages or otherwise employed to enhance the palatability of foods and beverages.

BACKGROUND OF THE INVENTION AND PRIOR ART

Dried spices and herbs, most often in their ground form, are used in the preparation of foods and beverages to add flavor, aroma, color, and preservative properties that make the food or beverage more palatable and appealing. The dried spices, ground or unground, are usually added to the food or beverage during the preparation at such a point in the preparation that time is allowed for the principal components of interest to be extracted into the food or beverage to impart the desired combination of attributes to the food or beverage. Further, as spices and herbs are notoriously known to have inconsistent levels of the flavor, aroma, color, or antioxidants, it is commonly required that spices of varying levels of the principal components of interest be blended to make a final product that is consistent with regard to the principal components of interest to achieve predictable and repeatable performance with respect to the flavor, aroma, color, or antioxidant release into the food or beverage system in which they are used. This is a costly and time consuming process.

As suggested in prior art, much of the flavor, aroma, and/or color often is not effectively transferred to the food or beverage. U.S. Pat. No. 2,507,084 overcomes this obstacle of under-utilization of the principal components of interest by first extracting the principal components of interest and subsequently coating the spent spice from the extraction process with a portion of the extract originally removed, thereby extending the useful amount of flavor and aroma that can be derived from a given quantity of spice. It is also disclosed that this process derives value from the exhausted spice solids, from which the flavor, aroma, color, or antioxidants have been removed, which would otherwise be a waste product. This is a complicated and costly process for recovery of the maximum value of the principal components of interest.

Traditional methods for the sterilization of ground spices and extracts involve the use of extremely toxic substances such as ethylene oxide or methyl bromide, non-edible solvents which are inherently difficult to remove from the plant solids, irradiation, or steam and moisture treatment to reduce plate counts to acceptable levels for use in foods and beverages. Chemical sterilization, irradiation, and non-edible solvent extraction of spices are disagreeable to the consumer because of the perceived risks of residual chemicals and/or radiation remaining in the plant matter and, as a result, several processes using added moisture, such as water or steam, at elevated pressures have been developed as alternatives. Typical sterilization procedures are disclosed in U.S. Pat. Nos. 4,210,678, 4,790,995, and 4,910,027. All sterilization processes are inherently costly in that they require a separate processing step or steps to accomplish the sterilization, and also present the possibility of further degrading the more unstable components. Addition of moisture or water vapor, as disclosed in U.S. Pat. Nos. 4,210,678 and 5,910,027, prior to or during the heating and sterilization process, results in a cooked aroma not typical of the fresh, dehydrated spice and also results in steam distillation and loss of some of the volatile flavor and aroma constituents.

Traditional extraction processes for the manufacture of concentrated extracts (concentrated several fold as compared with the raw material) involve not only the use of various non-edible solvent systems, but also a large proportion of solvent in relation to the compounds of interest. Many require the use of petroleum distillates, chlorinated solvents, or highly flammable solvents which must be eliminated almost completely from the finished products to make them safe for consumption. These systems require expensive distillation equipment and special precautions must be taken to ensure worker safety and to limit environmental impact. The intensive processing required often destroys, modifies, or loses some of the more unstable compounds, delicate aromas, flavors, or pigments. More significantly, the last traces of undesirable non-edible solvents are very difficult to separate from the concentrated extract. The residual solid must necessarily contain the same residual non-edible solvents, which are removed only with difficulty. Such residual solvents limit the potential use of the residual solid for human consumption, and are potential environmental contaminants.

Other concentration techniques rely on high pressure equipment to obtain good solvating properties from gases, e.g., liquid or supercritical $CO_2$ (U.S. Pat. No. 4,490,398). High pressure liquefied or supercritical gas extraction requires expensive equipment and has limited solvating abilities for some compounds requiring the addition of co-solvents, or solvents such as propane and butane, which are also difficult to control and may be environmentally sensitive or undesirable in a finished product.

Following extraction and desolventization, the concentrated extract is often standardized with edible solvents and emulsifiers to provide a concentrate with reproducible levels of the active or principal compounds of interest to the user.

In an effort to overcome the shortcomings and risks associated with the above-mentioned processes, extraction has been carried out using edible solvents such as vegetable oils or lard. Typical extraction procedures are disclosed in U.S. Pat. Nos. 3,732,111; 2,571,867; and 2,571,948. These methods require a relatively large volume of solvent in relation to the compounds of interest and result in a dilute extract which is limited in its application and which has few of the advantages of the concentrates which can be produced using volatile solvents.

U.S. Pat. No. 4,681,769 discloses a method for simultaneously extracting and concentrating in a series of high pressure countercurrent mechanical presses using relatively small amounts of vegetable oil as the solvent in an attempt to overcome the problem of dilution inherent in earlier processes. This method suffers from severe limitations in temperature and pressure ranges in an attempt to avoid unacceptable oxidative damage, color loss, yield losses, and flavor changes with the final result being that contact times must be unduly extended for up to 16–24 hours, adding greatly to the cost of the process. Extraction cycle times are unduly long for a given size pressing operation, and the process does not provide for a controlled degree of browning or for sterilization of the extract or of the residual solid. It is also limited to temperatures of less than 100° F. Maximum pressures of up to about 500 PSI (cone pressure) are claimed and this severely limits the efficiency and throughput rate for a given size pressing operation, as shown by the disclosure of this patent.

U.S. Pat. Nos. 4,790,995 and 4,910,027 require the addition of a coating of animal protein to protect the spice from the loss of volatile aroma compounds during the sterilization process with water vapor. U.S. Pat. No. 4,210,678 requires bringing the moisture of the spice to above 8–14%, in some cases up to 16–20%, and holding the spice for an extended period of time prior to sterilization to equilibrate the moisture. This additional step is costly and time consuming.

Above all, there is the unsolved problem of obtaining satisfactory yields, quality, and throughput rates of acceptable extract and spice and herb solids having an acceptable content of active principle without undesirable oxidative damage to, and reduced stability of, the principal compounds of interest, while at the same time providing for simultaneous sterilization of both the spice or herb solid and extract.

Sesame oil is known to possess a unique combination of antioxidants including gamma-tocopherol, sesamol and its precursors and/or reaction products such as sesamolin and sesamolinol, and sterols with an ethylidiene side chain, such as delta-5 avenasterol and citrostadienol as described in EP 0,477,825 A2. As such, and as claimed in EP 0,477,825 A2, it is useful as a stabilizing agent in other vegetable oils. However, it is disclosed in the aforementioned patent that "cold pressed" sesame oil is not as stable as solvent-extracted sesame oil and therefore is not acceptable for the intended use.

EP 0,477,825 A2 states that sesame oil extracted by "cold pressing" is not sufficiently resistant to oxidative deterioration and "is found not to be effective in the present invention; in a typical instance it was found to have a Rancimat value of only 3.4 hours." as compared to an RBD sesame oil with "a Rancimat value of 30.7 hours." This would severely limit the utility of a prior art pressed oil but not one which has the economic advantage of being produced in the present process wherein no non-edible solvents are used and the residual press cake solids have significant economic importance as they contain a portion of the principal components of interest at standardized levels and have not been adulterated or contacted by any non-food grade substance.

Obviously, existing prior art procedures leave much to be desired, and it is a primary objective of the present invention to provide a procedure for the production of spice and herb products which have significantly reduced microbial counts in both the extract and residual solids without the use of undesirable chemicals, irradiation, or high moisture contents with the attendant uncontrolled browning and loss of volatiles. It is also an objective of this invention to produce a spice or herb solid that will rapidly and efficiently release standardized amounts of the principal components of interest into the food or beverage in which it is used. It is also a primary objective of the present invention to provide a procedure for the production of spice and herb products having enhanced stability and which otherwise obviates the shortcomings of the prior art.

OBJECTS OF THE INVENTION

Accordingly, it is an object of the present invention to provide a process for simultaneously and rapidly extracting and concentrating the principal components of interest of a spice or herb plant material at temperatures of at least 215° F., preferably 215 to about 450° F., in a process which is completely free of petroleum, chlorinated or highly flammable solvent, does not require high pressure gas handling equipment, does not require solvent or distillation for solvent removal, and provides both an extract and a residual solid that are of significantly reduced microbial activity and are free of adulterants and impurities.

Another object of this invention is to prepare a residual solid or press cake that is standardized with respect to the principal components of interest, that when reground rapidly and efficiently imparts flavor, aroma, color, and/or other principal components of interest to a food or beverage in which it is used, and all without the use of undesirable non-edible solvents that are inherently difficult to remove from spice solids remaining after extraction prior to standardization with respect to the principal components of interest, and in fact without the necessity of using any solvent at all.

A further object of the invention is to provide such a process as further set forth under Summary of the Invention, wherein the spice or herb plant material contains lipids, oils, terpenes, or other edible "solvents" in amounts sufficient to effect extraction of the principal components of interest without the use of added solvents.

SUMMARY OF THE INVENTION

Figure 1:
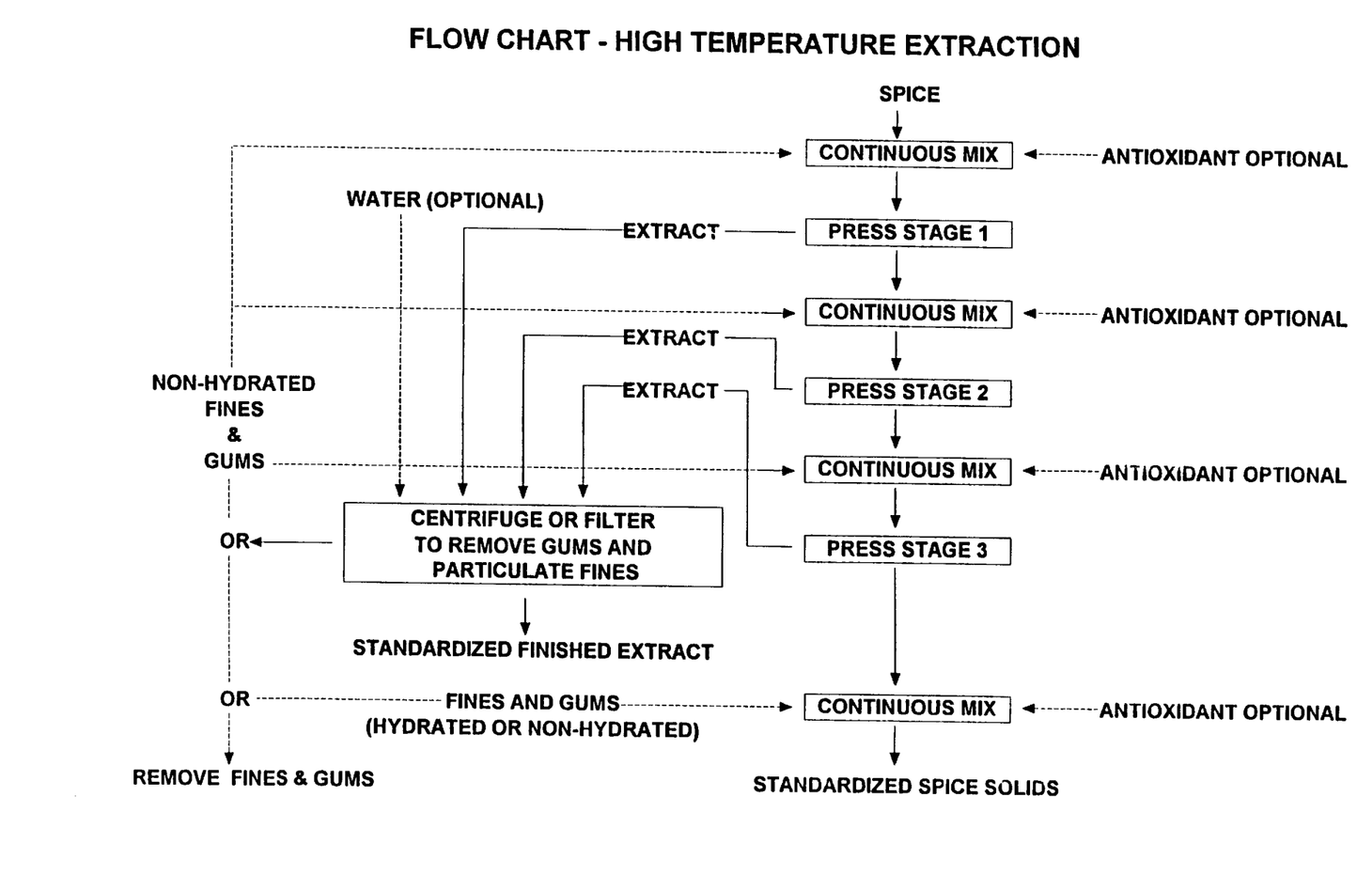
The FIGURE illustrates the process of the present invention, including the several process steps involved in the simultaneous high-temperature extraction and concentration of herb or spice plant solids, to produce the desired extract and sterilized residual solid, both of reduced bacterial content and both of which can be readily standardized to desired levels of the principal components of interest. Although the process illustrated comprises three pressing stages, the number of stages according to the invention is at least one and additional pressing stages are optional, the exact number of pressing stages being selected so as to effect the desired relative principal component concentration in the extract and in the residual solid.

The invention, then, inter alia, comprises the following, alone or in combination:

A high pressure pressing and extraction process for the production of a concentrated edible extract and quick-release edible residual solids, both of reduced bacterial content, and both of which contain pigment, flavor, and aroma and, when present in the staring material, antioxidant, from solids of a herb or spice plant selected from the group consisting of Umbelliferae, Myrtaceae, Myristica, Piper, and Sesamum, comprising the following steps:

subjecting said herb or spice plant solids to an extraction process involving at least one pressing stage to produce an extract and residual solids,     separating the extract from the pressing stage, separating the residual solids from the pressing stage, and optionally subjecting the residual solids to a further pressing stage, all pressing stages being carried out at a temperature of at least 215° F.; such a process wherein the temperature is 215 to about 450° F.; such a process wherein the solids are subjected to internal pressures in the press stage(s) of at least 6,000 pounds per square inch; such a process wherein the temperature is greater than 215° F.; such a process wherein the moisture content of the starting solids is less than 10% by weight, and wherein bacterial count reduction is effected at this low moisture content, thereby avoiding undesirable loss of volatile flavor and aroma constituents and avoiding the development of cooked, off flavors and aromas which occur at higher moisture contents; such a process wherein the solids extracted in the process are selected from the group consisting of celery, cumin, black pepper, sesame, mace, clove, coriander, and parsley; such a process wherein fine particulate solids are filtered or centrifuged from the extract and alternatively discarded, returned to a mixing or pressing stage of the process, or incorporated in the final residual solids; such a process which includes the steps of hydrating the final extract to add water to the extent of 5% to 200% by weight of the gums and fine particulate solids therein and filtering or centrifuging to remove said gums and solids; such a process including the step of returning separated hydrated gums and solids to the final residual solids; such a process wherein an effective stabilizing amount of an edible antioxidant or chelator is introduced into the process; such a process wherein the antioxidant comprises an antioxidant selected from the group consisting of lecithin, ascorbic acid, citric acid, tocopherol, ethoxyquin, BHA, BHT, TBHQ, tea catechins, sesame, and the antioxidant activity from an herb of the Labiatae family; such a process wherein the antioxidant comprises a naturally-occurring antioxidant from an herb of the family Labiatae or powdered ascorbic acid; such a process wherein the antioxidant comprises the antioxidant activity from an herb selected from the group consisting of rosemary, thyme, and sage; and such a process wherein the temperature is between about 215° F. and 235° F.

Moreover, an extract of herb or spice plant solids produced according to the process having a high level of principal flavor, aroma, color, or antioxidant components of interest and a low bacterial count due to the high temperature employed in its production and due to the low water content not greater than 10% in the starting herb or spice solids, and an extract of herb or spice plant solids having a low bacterial count due to the high temperature employed in its production and having improved stability due to the edible antioxidant therein produced according to the process, and residual spice or herb plant solid having a low bacterial count due to the high temperature employed in its production and having its tissue ruptured so as to produce quick release of the flavor, aroma, color, or antioxidant component therein, and which is standardized with respect to the principal flavor, aroma, color, or antioxidant component of interest, produced according to the process of the present invention.

THE PRESENT INVENTION IN GENERAL

Raw spices, either ground (usually to pass U.S. 40 mesh, and preferably to pass at least U.S. 20 mesh) or unground if coarse particles are desired in the residual solid or cake, e.g., spice solids having a moisture range of about 0.15% to 10% by weight, preferably 1.5% to 10% by weight (ASTA method 2.0), are the starting materials for the process of the present invention.

Typical spice and herb starting plant materials include, Umbelliferae, representatively celery, lovage, dill, carrot, fennel, cumin, caraway, parsley, coriander, angelica, and anise; Myrtaceae, representatively allspice and clove; of the genus Myristica, representatively mace and nutmeg; of the genus Piper, representatively black and white pepper; of the genus Sesamum representatively sesame seed; the defining characteristic being that it is such a spice or herb plant material from which flavor, aroma, color, and/or antioxidant can be extracted and used to flavor and/or color foods and beverages or otherwise employed to enhance the palatability of foods and beverages.

The comminuted or uncomminuted plant material is subjected to one or more mechanical pressing stages, whereby a concentrated extract of principal components is obtained and a final utilizable and preferably standardized residual solid is produced.

According to the present invention, the spice or herb plant material contains lipids, oils, terpenes, or other edible "solvents" in amounts sufficient to effect extraction of the principal components of interest without the use of added solvents. The parent spice or herb thus inherently contains vegetable oils at levels sufficiently high in the original plant material to permit the effective extraction of the principal components of interest simply by pressing, so that the addition of an edible solvent is not required for sterilization and to extract the principal components of interest and the spice or herb plant material can therefore simply be exposed to one or more pressing stages with the final extract being removed from each stage and not returned in a countercurrent flow. Thus all pressing stages are carried out in the essential absence of added solvent although, when an antioxidant is included in the process, it is frequently desirable to introduce the antioxidant in an edible solvent along with concomitant mixing, for better dispersion of the antioxidant throughout the plant solids, especially just ahead of one or more pressing stages. Such an amount of edible solvent, when employed, is only a small percentage by weight calculated on the weight of starting plant solids and, as such, may be employed without interfering with the objectives and advantages of the present invention.

By varying the pressure, temperature, spice solids feed rate, and the number of mixing and pressing stages, the concentration of the principal components can be controlled in both the extract and the residual solid.

As will be apparent to one skilled in the art, variations in the process of the present invention can be employed to produce variations in result, the most advantageous of which are the production of both extract of marketable potency and edible residual spice solids also characterized by marketable potency and rapid release of the principal components of interest.

For example, using ground celery seed of about 9% moisture and 22% extractable yield and 3% volatile oil, and leaving a residual extractable yield of 11% by weight of the starting spice, gives an extract of flavor strength that is equivalent to a hexane extract and a residual cake solid that has a flavor level acceptable for many food applications without the undesirable residual solvents that are typical of residual solids produced with organic solvents such as hexane. By varying the number of pressing stages and the internal pressures of the pressing stages, the residual solids can be standardized with respect to the principal components of interest while at the same time providing an extract of marketable potency, with both the extract and residual solids having significantly reduced microbiological activity. The high pressures and high shear forces in the pressing stage(s) rupture the cell tissue of the plant material, thereby effecting quick release of the principal components of interest left in the residual solid and effectively and dramatically increasing the utilization of the flavor and other principal components of the spice solid even though they are present at levels significantly below that of an untreated spice.

Although an edible solvent may be employed in the manner and to the extent indicated, extractable yields are in general in excess of 5% and vegetable oils are naturally present at levels sufficient to effect extraction of the principal components of interest and there is enough oil in the original spice or herb to effectively permit an economical extraction of the principal components of interest and recovery of the extract without added edible solvent.

Due to the treatment of high pressure and pressure relief, with pressures ranging from 6,000 to 30,000 psi in pressing stages of the operation, and due to frictional heat generated in these high pressure zones, both the residual solid and the extract exiting the presses surprisingly have a significantly reduced microbial load over that of the starting material even at moisture levels significantly lower than those indicated as being necessary by the prior art. Further, surprisingly and unexpectedly, the residual cake solids can in many cases be substituted directly, on a weight for weight basis, for the parent spice without any detectable reduction in flavor and aroma (or other principal component of interest) intensity even though they have significantly lower levels of these components. It is theorized that the high pressures, temperatures, and shear forces inherent in this process rupture the cell tissue making the compounds of interest much more readily available for extraction and dispersion from the residual solids into the food or beverage system.

The extract from the first or any subsequent pressing stage may be centrifuged or filtered to provide the finished extract free of particulate solids. In some cases, the fine particulate solids and gums in the extract may be hydrated to about 5% to 200% by weight of the gums and solids prior to centrifugation or filtration to give a crystal clear extract. If water is not used to hydrate the solids and gums, the fine particulate solids from the extract may conveniently be combined with the final residual solids, recycled back into a pressing stage of the process, or alternatively removed from the process. If water is used to hydrate the solids and gums, it is preferred that the solids and gums be added back to the final residual press solids or be removed from the process.

The small amount of edible solvent, if employed to disperse antioxidant, may be any edible solvent and especially one selected from the group consisting of soybean oil, corn oil, cottonseed oil, rapeseed oil, peanut oil, mono-, di-, or triglycerides, lecithin, edible essential oils, sesame oil, edible alcohols, benzyl alcohol, propylene glycol, glycerine, hydrogenated or partially hydrogenated fats or oils, polyoxyethylene sorbitan esters, limonene, edible animal fats or oils, mixtures thereof, and edible derivatives thereof, the essential aspects of the solvent when used being that it serves to disperse antioxidant and that it be edible.

The temperature to be employed during the processing and especially in the press stages of the process of the invention may be varied widely, but the process is generally carried out at a temperature below about 450° F., and between about 215° F. and 325° F., most preferably above 215° F. and especially between about 215° F. and 275° F.

Temperatures in excess of 215° F. are advantageously employed to achieve acceptable yields and increased throughput rates as compared to prior art. Higher temperatures are employed, most importantly, to reduce the microbial load of both the solids and the extract.

When an antioxidant or chelator is introduced into the process for the protection of the spice being processed, this is preferably of the Labiatae family, such as rosemary, thyme, or sage, which is known for its protective antioxidant activity (U.S. Pat. No. 5,209,870), or sesame, or tea catechins, but may alternatively be a suitable edible and preferably an approved food grade additive such as ethoxyquin, BHA, BHT, TBHQ, tocopherol, Vitamin C (e.g., as in U.S. Pat. Nos. 5,290,481, 5,296,249, or 5,314,686), citric acid, EDTA, or the like. The process of the present invention is particularly adaptable to the extraction of any spice or herb containing pigments and/or flavor, pungency, aroma, or antioxidants which impart those characteristics to a food with which it is combined.

DETAILED DESCRIPTION OF THE INVENTION

The following examples are given to illustrate the present invention but are not to be construed as limiting.

EXAMPLE 1

Celery Extraction, Flavor Activation, and Pasteurization

Dried celery seed is ground in a hammermill and the resulting ground celery (95% passing US 40 mesh) is processed in a high pressure extraction system comprising one pressing stage, using an Egon Keller Model KEK-100 Screw Press. No edible solvent is added. The raw material celery seed is continuously fed at a rate of about 300 lbs per hour with a total contact time in the pressing stages of about 15 to 120 seconds. The pressing stage is operated at about 20,000 psi internal pressure and about 215 to 235° F., which is maintained by cooling with water or heating with steam through the bore of the press shafts as needed.

The starting extractable yield of the ground celery is about 23.7% by exhaustive soxhlet extract with hexane, the volatile oil content is about 1.7% by ASTA method 5.0. The aerobic plate count of the raw spice is 63,000,000 (Analysis run according to Bacterial Analytical manual By AOAC, 8th edition, 1995, and ISO-GRID Methods Manual, 3rd edition, 1989) and the moisture content is 9.7% by ASTA method 2.0.

The principal components of interest in both the extract and the residual solids are phthalides (Sedanenolide and N-Butyl phthalide) and volatile oils, which account for a significant portion of the flavor and aroma of the spice. The phthalide area count by HPLC (using a reverse phase, C-18 column and an isocratic solvent mixture of 47% acetonitrile/53% water) of the soxhlet extract from the raw spice is 131,682. The resulting final extract from the pressing process has a phthalide area count of 127,248 and a volatile oil content of about 7.3%. The reground celery residual solids have an extractable yield by soxhlet of 11% and a volatile oil content of about 0.68%. This clearly demonstrates that the flavor and aroma components of the raw spice can be effectively extracted using high pressure, high temperature mechanical pressing without any solvent other than the naturally occurring oils in the spice.

The aerobic plate count of the extract is 1,200, and 200,000 for the final residual solid exiting the press. This clearly demonstrates, surprisingly and contrary to prior art, that the plate count of a spice and its extract can be very significantly reduced at such low moisture contents.

The flavor profile of the resulting celery residual cake solids is compared to a sample of ground celery seed manufactured by McCormick & Co., Inc. (Extractable yield of 28.3%). Four grams each of the residual solids and the ground celery seed were extracted for 20 minutes in 100 ml of ethanol in a 100 ml Erlenmeyer flask immersed in water in a sonicator to model the release of the principal flavor of the spice in a food system. The filtered ethanol extracts were further diluted to 1/5000 dilutions in water for flavor evaluation. Triangle tests were done on the samples. The samples were coded with random three-digit numbers and twelve expert panelists were asked to pick the sample that was different compared to the McCormick ground celery seed. Six of the twelve panelists could not pick the residual celery cake solids as being different from the untreated ground celery seed with respect to flavor profile and intensity. By statistical analysis (according to methods described in *Sensory Evaluation Techniques,* Vol. II, by Morten Meilgaard, 1987, page 133), this clearly and surprisingly demonstrates that there is no significant difference in flavor intensity and profile between the commercial unextracted ground celery seed and the residual cake solids, from which more than ½ the extractable yield has already been removed. This clearly demonstrates that the high shear, high temperature process of the present invention effects quick and significantly more efficient release of flavors in a food system, thereby effectively and dramatically increasing the utilization of the flavor components of the spice even though they are present at levels significantly below that of an untreated spice. This is contrary to expectations and overcomes, with a simple and economical process, the obstacles disclosed in the prior art.

EXAMPLE 2

Cumin Extraction, Flavor Activation, and Pasteurization

Cumin seed at 8% moisture is processed in the same manner as given in Example 1. The starting ground cumin had an extractable yield of 28.5%, a volatile oil content of 2.0%, and an aerobic plate count of 9,000,000. The last traces of suspended solids with the solids being returned and combined with the residual solid cake exiting the press. The reground residual solids had an extractable yield of 11.5%, a volatile oil content of 0.41%, and an aerobic plate count of 85,000. Triangle tests were performed on the residual solids in the same manner as given in Example 1 except that they were compared to the ground starting cumin seed. Seven of twelve panelists could not pick the residual cumin cake solids as being different from the untreated, ground starting material. This clearly demonstrates that the high shear, high temperature process effects quick and significantly more efficient release of flavors in a food system in a consistent and predictable way while at the same time significantly reducing the bacterial counts at moisture contents below those required in prior art.

EXAMPLE 3

Black Pepper Extraction, Flavor Activation, Pasteurization, and Standardization

Unground Black Pepper berries at 3% moisture, 21% extractable yield, 12% piperine, and 5% volatile oil were extracted in a two-stage pressing operation. The aerobic plate count was 68,000,000. The piperine levels were established using ASTA method 12.1. The presses were operated at 30,000 PSI internal pressure and 250–275° F. with the temperatures being maintained by cooling with water or heating with steam through the bore of the press shafts as needed. The extract was collected from each pressing stage and centrifuged to remove the suspended solids with the solids removed being returned to the final press cake residual solids.

The piperine content of the final press cake solids was 6.1%, the volatile oil content was 3.25%, and the aerobic plate count was 1,800,000. The combined final extract from both pressing stages was 52% piperine, 11.6% volatile oil, and had an aerobic plate count of 230.

By varying the pressure of the pressing stages between 10,000 and 30,000 PSI the piperine content of the residual press cake solids was controlled between 10.5% and 6.0%, demonstrating that the piperine content of the residual solids can be standardized at specific levels of the principal compound of interest, in this case, piperine which is responsible for the pungency of black pepper. This overcomes the difficulty of obtaining a spice solid with consistent and predictable levels of the principal components of interest without the complicated process of using a non-edible solvent extraction process, desolventization of the spice solids and extract, and dispersing of a portion of the final extract back onto the residual solids as disclosed in prior art.

The residual cake solid, reground to pass 20 mesh, at 6% piperine was compared to a ground, unextracted commercial grade black pepper at 6% piperine by extracting both samples in ethanol for 20 minutes using the procedure described in Example 1. The percentage of piperine extracted in this model food system for each sample was determined by measuring the absorbance of the filtered ethanol solution from each sample. 85% of the piperine was extracted from the residual cake solids and only 45% was extracted from the unextracted commercial grade black pepper.

This clearly demonstrates that residual press solids release the principal components of interest much more rapidly and efficiently into a food system, thereby significantly improving the utilization of the spice. Further, surprisingly and contrary to prior art, the plate counts of both the solids and the extract were very significantly reduced at such low moisture contents.

EXAMPLE 4

Extraction, Antioxidant Addition, and Pasteurization of Sesame Seed

Sesame oil is known to possess a unique combination of antioxidants including gamma-tocopherol, sesamol and its precursors and/or reaction products such as sesamolin and sesamolinol, and sterols with an ethylidiene side chain, such as delta-5 avenasterol and citrostadienol as described in EP 0,477,825 A2. As such, and as claimed in EP 0,477,825 A2, it is useful as a stabilizing agent in other vegetable oils. However, it is disclosed in the aforementioned patent that "cold pressed" sesame oil is not as stable as traditionally solvent-extracted sesame oils and therefore is not acceptable for the intended use.

Dehulled, whole sesame seed at 6% moisture, 48% extractable yield, and an aerobic plate count of 2,500,000 is extracted in a two-stage pressing operation with the presses being operated at about 6,000 and 20,000 PSI internal pressures respectively and with temperatures of the cake exiting the presses being maintained at about 225° F. using the procedures generally described in previous Examples except that an antioxidant blend containing 29% lecithin, 20% powdered ascorbic acid, 5% citric acid, 15% tocopherol, and 1% rosemary extract (in accordance with Chang and Wu U.S. Pat. No. 5,077,069) is dispersed on the sesame seeds prior to pressing at a level of 0.1% by weight of the starting plant material. The antioxidant blend, prior to dispersion on the sesame seed, is dispersed in an equal volume of edible oil, in this case sesame oil from a previous extraction. This aids in the dispersion of the antioxidant.

The extracts from both pressing stages are combined and hydrated with distilled water at about 75% by weight of the acetone-insoluble matter contained in the combined extracts. The hydrated mixture is then centrifuged to remove the gums and suspended solids with said gums and solids being returned to the residual press cake solids exiting the second pressing stage.

The cake exiting the final pressing stage had an extractable yield of 15% and an aerobic plate count of 15,000. The final oil was crystal clear and had an aerobic plate count of 500. This clearly demonstrates the effectiveness of the extraction and a very significant reduction in plate count at low moisture contents contrary to prior art.

The test was repeated with all conditions being the same except that no addition of antioxidant was included in the process. The unprotected sesame oil thus produced, along with a sample of a commercially available hexane-extracted RBD sesame oil, are compared to oil produced with the antioxidant blend using a 679 Rancimat™. In this method, the stability of a particular oil is compared to the stability of an untreated control held at controlled temperatures while air is bubbled through the sample at 18 liters per minute. The induction time is measured by a sharp change in conductivity of a solution into which air, blown through the oil sample, is passed. The oil is maintained at 120° C. By plotting conductivity versus time, a sharp inflection point is observed which is indicative of rapid deterioration of the oil and proneness to rancidity.

In this example, the untreated pressed oil control had an induction time of 3.5 hours. A sample of the pressed oil produced with the addition of the antioxidant mixture had an induction time of 32 hours. A sample of the hexane-extracted RBD oil had an induction time of 30 hours. This clearly demonstrates that the inclusion of antioxidants can improve the stability of both the extract and the residual cake solids produced by the present process, providing a sesame oil having stability that is equal to or greater than RBD (refined, bleached, and deodorized) sesame oil and certainly much improved over a control produced without antioxidant addition. This is contrary to conventional wisdom as disclosed in EP 0,477,825 A2.

Other suitable antioxidants (e.g., lecithin, butylated hydroxy anisole (BHA), butylated hydroxy toluene BHT, tertiary butyl hydroxy quinone (TBHQ), tea catechins, Labiatae herb antioxidants, finely divided ascorbic acid, tocopherol, and citric acid can be substituted in whole or in part for the specific antioxidant mixture employed with similar desirable protective results, preferably a naturally occurring antioxidant from an herb of the Labiatae family, e.g., rosemary, sage, or thyme, or powdered ascorbic acid.

EXAMPLE 5

Extraction, Activation, and Pasteurization of Mace

Mace, chopped in a hammermill to pass US 20 mesh, at 8% moisture, 55% extractable yield, 8% volatile oil, with an aerobic plate count of 99,000,000 was extracted in a two-stage pressing operation using the procedure given in Example 4.

The extracts from both pressing stages were combined and the fine particulate solids were removed by centrifuging. The fine particulates were returned to the cake exiting the second pressing stage. The final extract had an aerobic plate count of 1,500, again demonstrating that significant reduction in bacterial counts can be achieved at such low moisture contents contrary to prior art.

The final residual press solids had an extractable yield of 20%, a volatile oil content of 2%, and an aerobic plate count of 15,000, clearly demonstrating that the plate count can be reduced at such low moisture contents, contrary to prior art.

A triangle test was performed as described in Example 1 and the residual press solids were compared to a retail grade ground mace with an extractable yield of 35% and a volatile oil content of 6%. Seven of twelve trained panelists could not pick the press residual solids as being different from the retail ground mace with regard to flavor intensity, even though the retail grade contained significantly more extractable yield and volatile oil. This clearly demonstrates that the high shear, high temperature pressing operation of the invention significantly improves the flavor release characteristics of the spice and that much higher utilization of the principal flavor compounds can thus be achieved.

EXAMPLE 6

Extraction, Activation, Standardization, and Pasteurization of Clove

Clove, ground to pass US 20 mesh, at 9% moisture, 22% extractable yield, 18% volatile oil, with an aerobic plate count of 95,000,000 is extracted in a single-stage pressing operation using procedure as given in Example 1.

The fine particulate solids are removed from the extract by centrifuging. The fine particulates were returned to the cake exiting the press. The final extract had an aerobic plate count of 1,000, again demonstrating that significant reduction in bacterial count can be achieved at such low moisture contents contrary to prior art.

The final residual press solids have an extractable yield of 12%, a volatile oil content of 12%, and an aerobic plate count of 15,000, clearly demonstrating that the plate count can be reduced at such low moisture contents, contrary to prior art.

A triangle test is performed as described in Example 1 and the residual press solids are compared to unextracted ground clove with an extractable yield of 17% and a volatile oil content of 12%. Six of twelve trained panelists are not able to pick the press residual solids as being different from the unextracted ground clove even though the unextracted clove contains significantly more extractable yield. This clearly demonstrates that the high shear, high temperature pressing operation of the invention significantly improves the flavor release characteristics of the spice and much higher utilization of the principal flavor compounds can thus be achieved.

EXAMPLE 7

Extraction, Activation, Standardization, and Pasteurization of Parsley

Parsley seed at 8% moisture is processed in the same manner as given in Example 1 except that the pressing stage is operated at about 10,000 PSI. The starting ground parsley has an extractable yield of 22.5%, a volatile oil content of 2.2%, and an aerobic plate count of 25,000,000. The extract exiting the press is centrifuged to remove the last traces of suspended solids with the solids being returned and combined with the residual cake solids exiting the press. The reground residual solids have an extractable yield of 14.0%, a volatile oil content of 1.2%, and an aerobic plate count of 500,000. The extract has an aerobic plate count of 1,500. Triangle tests are performed on the residual solids in the same manner as given in Example 1 except that they are compared to the ground starting parsley seed. Six of twelve panelists cannot pick the residual parsley cake solids as being different from the untreated, ground starting material. This clearly demonstrates that the high shear, high temperature process effects quick and significantly more efficient release of flavors from an herb in a food system in a consistent and predictable way while at the same time significantly reducing the bacterial count at moisture contents below those considered necessary by the prior art.

EXAMPLE 8

Extraction, Activation, Standardization, and Pasteurization of Coriander

Coriander seed, ground to pass US 20 mesh, at 7% moisture, 19% extractable yield, 6% volatile oil, with an aerobic plate count of 16,000,000 is extracted in a single-stage pressing operation using procedure as given in Example 1.

The final residual press solids had an extractable yield of 10%, a volatile oil content of 3%, and an aerobic plate count of 45,000. The final extract, after centrifuging to remove the fine particulate solids, had an aerobic plate count of 1,000. This again clearly demonstrates that bacterial plate counts can be very significantly reduced at moisture contents below those disclosed by prior art.

By varying the pressure of the pressing process between 6,000 and 30,000 PSI, the extractable yield in the final residual press solids was varied from about 12% down to 5%, demonstrating that the levels of residual yield in the cake solids can be readily standardized to consistent levels even though the levels in the starting unextracted spice may vary significantly, thereby providing a spice with consistent flavor intensity comparable to that of an unextracted ground spice to the end user. This allows the food manufacturer or end consumer to achieve predictable levels of flavor release in a food or beverage system, overcoming the difficulty previously presented by spices in general where the levels of the principal compounds of interest vary considerably with weather conditions for a given crop year, source or origin, and storage conditions and duration.

It is thereby seen that an improved process for the extraction and sterilization of spice and herb plant solids, whereby improved yields of both extract and residual solids are obtained, whereby both the extract and the residual solids have improved color stability and freedom from bacterial contamination due to the higher temperatures employed, whereby an extract in the form of a clear solution can be obtained by removal of gums and particulate solids in the form of their insoluble hydrates, whereby even greater color stability can be effected by the employment of edible antioxidants, all without the expected disadvantages from employing higher temperatures and lower water content as clearly indicated by the prior art, and whereby all of the stated objects of the invention have been accomplished, has been provided.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

I claim:

1. An extract of herb or spice plant solids, having a high level of principal flavor, aroma, color, or antioxidant components of interest and a low bacterial count due to high temperature and pressure employed in its production and due to low water content not greater than 10% by weight in starting herb or spice solids, produced by a high pressure pressing and extraction process for the production of a concentrated edible extract and tissue-ruptured quick-release edible residual solids, both of reduced bacterial content, and both of which contain pigment, flavor, and aroma and, when present in starting material, antioxidant, from starting solids of a herb or spice plant selected from the group consisting of Umbelliferae, Myrtaceae, Myristica, Piper, and Sesamum, comprising the following steps:

subjecting said starting herb or spice plant solids to an extraction process involving at least one pressing stage to produce an extract and residual solids, separating the extract from the pressing stage, separating the residual solids from the pressing stage, and optionally subjecting the residual solids to a further pressing stage, all pressing stages being carried out at a temperature of at least 215° F. and a pressure of about 6,000 to about 30,000 pounds per square inch, wherein moisture content of the starting solids is less than 10% by weight, and wherein bacterial count reduction is effected at this low moisture content, thereby avoiding undesirable loss of volatile flavor and aroma constituents and avoiding development of cooked, off flavors and aromas which occur at higher moisture contents.

2. An extract of herb or spice plant solids, having a low bacterial count due to high temperature and pressure employed in its production and having improved stability due to edible antioxidant therein, produced by a high pressure pressing and extraction process for the production of a concentrated edible extract and tissue-ruptured quick-release edible residual solids, both of reduced bacterial content, and both of which contain pigment, flavor, and aroma and, when present in starting material, antioxidant, from starting solids of a herb or spice plant selected from the group consisting of Umbelliferae, Myrtaceae, Myristica, Piper, and Sesamum, comprising the following steps:

subjecting said starting herb or spice plant solids to an extraction process involving at least one pressing stage to produce an extract and residual solids, separating the extract from the pressing stage, separating the residual solids from the pressing stage, and optionally subjecting the residual solids to a further pressing stage, all pressing stages being carried out at a temperature of at least 215° F. and a pressure of about 6,000 to about 30,000 pounds per square inch, wherein the moisture content of the starting solids is less than 10% by weight, and wherein an effective stabilizing amount of an edible antioxidant or chelator is introduced into the process.

3. Residual spice or herb plant solids, having a low bacterial count due to high temperature and pressure employed in their production and having their tissue ruptured so as to produce quick release of flavor, aroma, color, or antioxidant component therein, and which are standardized with respect to principal flavor, aroma, color, or antioxidant component of interest, produced by a high pressure pressing and extraction process for the production of a concentrated edible extract and tissue-ruptured quick-release edible residual solids, both of reduced bacterial content, and both of which contain pigment, flavor, and aroma and, when present in starting material, antioxidant, from starting solids of a herb or spice plant selected from the group consisting of Umbelliferae, Myrtaceae, Myristica, Piper, and Sesamum, comprising the following steps:

subjecting starting herb or spice plant solids to an extraction process involving at least one pressing stage to produce an extract and residual solids, separating the extract from the pressing stage, separating the residual solids from the pressing stage, and optionally subjecting the residual solids to a further pressing stage, wherein the starting solids have a moisture content less than 10% by weight, all pressing stages being carried out at a temperature of at least 215° F. and a pressure of about 6,000 to about 30,000 pounds per square inch.

4. A product of claim 1, wherein the temperature in the process is up to about 450° F.

5. A product of claim 2, wherein the antioxidant used in the process comprises an antioxidant selected from the group consisting of lecithin, ascorbic acid, citric acid, tocopherol, ethoxyquin, BHA, BHT, TBHQ, tea catechins, sesame, and antioxidant activity from an herb of family Labiatae.

6. A product of claim 2, wherein the antioxidant used in the process comprises a naturally-occurring antioxidant from an herb of family Labiatae or powdered ascorbic acid.

7. A product of claim 2, wherein the antioxidant used in the process comprises antioxidant activity from an herb selected from the group consisting of rosemary, thyme, and sage.

8. A product of claim 2, wherein the temperature used in the process is between about 215° F. and 275° F.

* * * * *

UNITED STATES PATENT AND TRADEMARK OFFICE
CERTIFICATE OF CORRECTION

PATENT NO. : 5,985,352
DATED : November 19, 1999
INVENTOR(S) : George N. Todd

It is certified that error appears in the above-identified patent and that said Letters Patent is hereby corrected as shown below:

Title Page, [56] References Cited, U S Patent Documents:
"2,507,084     5/1950     Ansel ....... 426/424"
should read -- 2,507,084    5,1950    Ansel .....
426/429 --.

Column 16, line 20: At the end of the line after "herb"
insert -- of family Labiatae --.

Signed and Sealed this

Twenty-seventh Day of June, 2000

Attest:

Attesting Officer

Q. TODD DICKINSON
Director of Patents and Trademarks